United States Patent [19]
Takeuchi et al.

[11] Patent Number: 5,618,765
[45] Date of Patent: Apr. 8, 1997

[54] CERAMICS POROUS BODY AND METHOD OF PREPARING THE SAME

[75] Inventors: Hisao Takeuchi, Ita; Seiji Nakahata, Itami; Takahiro Matsuura, Itami; Chihiro Kawai, Itami, all of Japan

[73] Assignee: Sumitomo Electric Industries, Ltd., Osaka, Japan

[21] Appl. No.: 367,220
[22] PCT Filed: May 19, 1994
[86] PCT No.: PCT/JP94/00803
    § 371 Date: Jan. 6, 1995
    § 102(e) Date: Jan. 6, 1995
[87] PCT Pub. No.: WO94/27929
    PCT Pub. Date: Dec. 8, 1994

[30] Foreign Application Priority Data

May 20, 1993 [JP] Japan .................................. 5-118711

[51] Int. Cl.$^6$ .................................................. C04B 35/58
[52] U.S. Cl. ................................ 501/80; 501/97; 501/98; 501/152
[58] Field of Search ............................... 501/80, 97, 98, 501/152

[56] References Cited

U.S. PATENT DOCUMENTS

| | | |
|---|---|---|
| 4,332,909 | 6/1982 | Nishida et al. |
| 4,629,707 | 12/1986 | Wolfe ............................ 501/97 |
| 5,269,989 | 12/1993 | Pyzik ............................ 264/60 |

FOREIGN PATENT DOCUMENTS

| | | |
|---|---|---|
| 0123292 | 10/1984 | European Pat. Off. |
| 3835807 | 5/1989 | Germany. |
| 56-75546 | 6/1981 | Japan. |
| 55-188743 | 7/1982 | Japan. |
| 61-53176 | 3/1986 | Japan. |
| 62-018621 | 1/1987 | Japan. |
| 62-18621 | 1/1987 | Japan. |
| 63-156070 | 6/1988 | Japan. |
| 63-291882 | 11/1988 | Japan. |
| 1-93469 | 4/1989 | Japan. |
| 1-188479 | 7/1989 | Japan. |
| 2-089812 | 3/1990 | Japan. |
| 3150275 | 6/1991 | Japan. |
| 3-170376 | 7/1991 | Japan. |
| 3-281740 | 12/1991 | Japan. |
| 4-037668 | 2/1992 | Japan. |
| 4-37668 | 2/1992 | Japan. |
| 4-219374 | 8/1992 | Japan. |
| 4-285079 | 10/1992 | Japan. |
| 4-357170 | 12/1992 | Japan. |
| 6116054 | 4/1994 | Japan. |

OTHER PUBLICATIONS

Journal of Ceramic Society of Japan 100(5) 758–762 (1992) no month.
Microstructure And electrical–Properties In A Humid Atmosphere by Susumu Nakayama et al.
Ceramic Transactions, ISSN 1042–1122, vol. 31 Porous Materials (1992) no month.
JIS R 1601 (English version) Testing Method for Flexural Strength (Modulus of Rupture) of High Performance Ceramics, Japanese Standard Assoc. (1981) no month.
Journal of Ceramic Society of Japan 100(5) 758–762 (1992) no month.
Microstructure And Electrical–Properties In A Humid Atmosphere by Susumu Nakayama et al.
Ceramic Transactions, ISSN 1042–1122, vol. 31 Porous Materials (1992) no month.

*Primary Examiner*—Paul Marcantoni
*Attorney, Agent, or Firm*—W. G. Fasse; W. F. Fasse

[57] ABSTRACT

A ceramics porous body having a high porosity as well as high strength is especially suitable for use as a filter for removing foreign matter from a fluid or as a catalytic carrier. The porous body has a porosity of at least 30% and comprises columnar ceramic grains having an aspect ratio of at least 3. In particular, the porous body comprises $Si_3N_4$ grains, of which at least 60% are hexagonal columnar beta-$Si_3N_4$ grains. The porous body further comprises at least one compound of a rare earth element in an amount of at least 1 vol.% and not more than 20 vol.% of an oxide of the rare earth element, and optionally at least one compound of elements of the groups IIa and IIIb of the periodic table and transition metal elements in an amount of not more than 5 vol.% of an oxide of each element. A compact of mixed powder obtained by adding the compound powder of the rare earth element to silicon nitride powder is heat treated in a nitrogen atmosphere at a temperature of at least 1500° C., to prepare the silicon nitride ceramic porous body.

18 Claims, No Drawings

CERAMICS POROUS BODY AND METHOD OF PREPARING THE SAME

FIELD OF THE INVENTION

The present invention generally relates to a ceramics porous body which is useful as a filter material for removing foreign matter from a fluid or as a catalytic carrier, and more specifically, it relates to a silicon nitride ceramics porous body and a method of preparing the same.

BACKGROUND ART

Known porous bodies employed for filter materials or catalytic carriers include those consisting of various materials such as resin, metals or ceramics. Among these, a filter or a catalytic carrier consisting of a ceramics material is generally employed in high temperature or strongly corrosive environments which other materials cannot withstand. A filter or a catalytic carrier consisting of oxide ceramics such as alumina ($Al_2O_3$) has already been put into practice.

As to a porous body consisting of nonoxide ceramics, on the other hand, only small examples have been put into practice while Japanese Patent Laying-Open No. 63-291882 discloses a silicon nitride based or silicon carbide based porous body prepared by a heat treatment. Further, Japanese Patent Laying-Open No. 1-188479 discloses a method of compacting mixed powder of silicon powder and silicon nitride powder of relatively coarse particles and thereafter nitriding the same thereby preparing a porous body as a solid target.

As hereinabove described, it is difficult to use a porous body consisting of resin or a metal in a high temperature or corrosive atmosphere. It is inevitably necessary to employ a porous body made of ceramics for a filter for removing foreign matter from a high-temperature exhaust gas or for a carrier serving as a catalyst for decomposing a harmful matter.

As an example of such porous bodies made of ceramics, porous bodies made of alumina have been put into practice. While the porous bodies of alumina are varied in pore size, porosity and bending strength, a porous body having a porosity of 35 to 40% and a mean pore size of 25 to 130 μm has a bending strength of 20 to 35 MPa, whereby the strength of the porous body is insufficient depending on its use.

In the silicon nitride based porous body disclosed in the aforementioned Japanese Patent Laying-Open No. 63-291882, the porosity is less than 30% and fluid permeability is insufficient. In general, the strength of ceramics tends to be reduced following an increase in the porosity, and it has been extremely difficult to attain compatibility between the porosity and the strength.

SUMMARY OF THE INVENTION

In view of the above, the present invention has been proposed in order to solve the aforementioned problems, and an object thereof is to provide a ceramics porous body having high porosity as well as high strength.

The present inventors have deeply studied on the aforementioned subject, and discovered that it is possible to prepare a silicon nitride ceramics porous body that is mainly composed of columnar $\beta$-$Si_3N_4$ ($\beta$-silicon nitride) crystal grains and capable of maintaining high strength also when its porosity is high, by heat treating a compact of mixed powder of silicon nitride ($Si_3N_4$) powder and prescribed additive powder at a high temperature.

Namely, a ceramic porous body according to the present invention is generally characterized in that it has a porosity of at least 30% and is mainly composed of columnar ceramics grains having an aspect ratio of at least 3. Specifically, it is a porous body having a mean pore size of at least 0.05 μm and not more than 12 μm. Further, the crystal grains preferably have the shape of hexagonal poles or columns, i.e. a rod-like crystal shape with a hexagonal cross-section.

More specifically, the ceramics porous body according to the present invention is a silicon nitride ceramics porous body that is mainly composed of silicon nitride with a ratio of at least 60%, preferably at least 90%, of $\beta$-$Si_3N_4$ columnar grains with respect to the entire silicon nitride grains, contains at least one compound of a rare earth element with at least 1 volume % and not more than 20 volume % of an oxide of the rare earth element, and has a porosity of at least 30%.

The aforementioned silicon nitride ceramics porous body may contain at least one of compound of elements of the groups IIa and IIIb of the periodic table and transition metal elements, with by not more than 5 volume % of an oxide of each element. Further, the silicon nitride ceramics porous body according to the present invention preferably has bending strength of at least 80 MPa at an ordinary temperature, i.e. room temperature and bending strength of at least 50 MPa at a temperature of 1000° C.

In summary, further, a method of preparing a silicon nitride ceramics porous body according to the present invention comprises the following steps.

A first step involves adding at least one compound powder of a rare earth element in an amount corresponding to at least 1 volume % and not more than 20 volume % of an oxide of the rare earth element, or further adding at least one compound of elements of the groups IIa and IIIb of the periodic table and transition metal elements in an amount corresponding to not more than 5 volume % of an oxide of each element, to silicon nitride powder, thereby preparing a mixed powder.

A subsequent step involves preparing a compact from the aforementioned mixed powder.

A further subsequent step involves heat treating the compact in a nitrogen atmosphere at a temperature of at least 1500° C. and not more than 2100° C.

In the present invention, the compound of a rare earth element acts to react with $SiO_2$ existing on the surface of the raw material of the silicon nitride ($Si_3N_4$) powder during the heat treatment for forming a liquid phase and solidly dissolving $Si_3N_4$, thereby precipitating columnar $\beta$-$Si_3N_4$ crystal grains. Further, the compound of the rare earth element acts to exist outside the D-$Si_3N_4$ grains as a grain boundary phase after the heat treatment, for joining the $\beta$-$Si_3N_4$ grains and maintaining strength. The rare earth element indicates an Sc, Y or lanthanoid element. The ratio of the added compound of the rare earth element is suitably in the range of 1 to 20 volume % of an oxide of the rare earth element, and more preferably 2 to 10 volume %. The form of the grain boundary phase is a silicate such as $Y_2O_3 \cdot SiO_2$, or an oxynitride such as $Y_2O_3 \cdot Si_3N_4$. Columnarization of the $\beta$-$Si_3N_4$ crystal grains is not sufficient if the added quantity of the compound of the rare earth element is less than 1 volume %, while oxidation resistance and strength at a high temperature are reduced if the amount exceeds 20 volume %, which further leads to increase in preparation cost since the rare earth element is generally high-priced.

The compound(s) of the element(s) of the group(s) IIa and/or IIIb of the periodic table and/or the transition metal element(s) is/are added when a sintered body is prepared, in general. The aforementioned compound of the rare earth element acts to reduce a liquid phase forming temperature, facilitate densification and improve strength when the same is employed with the compound(s) of the element(s) of the group(s) IIa and/or IIIb of the periodic table and/or the transition metal element(s). The elements of the group IIa of the periodic table are Be, Mg, Ca, Sr and the like, the elements of the group IIIb are B, Al, Ga and the like, and the transition metal elements are Fe, Ti, Zr and the like.

In order to prepare a porous body having high porosity, the added or additional ratio of the compound of such an element is preferably small. The added amount is suitably not more than 5 volume % of an oxide of each element, preferably not more than 2 volume %, and more preferably not more than 1 volume %.

Due to addition of the compound(s) of the element(s) of the group(s) IIa and/or IIIb of the periodic table and/or the transition metal element(s), on the other hand, the liquid phase is formed in a lower temperature region, whereby grain growth also takes place in a low temperature region. This is conceivably because the grain growth is caused by re-precipitation of $Si_3N_4$ which is dissolved in the liquid phase, to reduce a grain growth starting temperature. When the compound(s) of the element(s) of the group(s) IIa and/or IIIb and/or the transition metal element(s) is/are added, therefore, it is possible to obtain a high-strength porous body at a low temperature, thereby attaining an advantage in view of the preparation cost. Further, such grain growth in a low temperature region tends to form fine crystal grains, whereby it is possible to prepare a porous body having a small pore size.

When the additional ratio of the compound(s) of the element(s) of the group(s) IIa and/or IIIb and/or the transition metal element(s) exceeds 5 volume %, densification is disadvantageously caused before columnar grain growth takes place to reduce porosity of the porous body while oxidation resistance is reduced due to a high densification effect from the low temperature region.

Particularly when a compound of a IVa group element such as Ti among the transition metals is added, the compound reacts with $\beta$-$Si_3N_4$ at a high temperature of at least 1600° C. and it is possible to increase the bonding strength between the crystal grains, whereby a porous body of high strength can be obtained.

While the $Si_3N_4$ powder employed as a raw material is mainly composed of $\alpha$-$Si_3N_4$ in general, $\beta$-$Si_3N_4$ or amorphous silicon nitride may alternatively be employed as the raw material. A mean grain size of the silicon nitride powder is preferably at least 0.1 μm and not more than 20 μm. If the mean grain size of the silicon nitride powder is less than 0.1 μm, agglomeration of the powder materials is so intensely caused that the relative density of the compact as obtained is not more than 30%, and the handling strength of the compact as well as the strength of the porous body after the heat treatment are insufficient. When the mean grain size of the silicon nitride powder exceeds 20 μm, on the other hand, the degree of sintering by the heat treatment is reduced and the porous body cannot attain a strength of at least 80 MPa.

Most generally the aforementioned compound of the rare earth element and the compound(s) of the element(s) of the group(s) IIa and/or IIIb of the periodic table and/or the transition metal element(s) is/are added as oxide powder materials, but it is also possible to add the same as compounds such as hydroxides or alkoxides which are decomposed to form powder materials of hydroxides or oxides. It is also possible to add these compounds in the form of nitride powder materials or the like.

These powder materials are mixed with each other by a prescribed method such as a ball mill method, and thereafter compacted. Also as to the compacting method, it is possible to employ a prescribed method such as die pressing or CIP (cold isostatic pressing). The compact density varies with the characteristics of the powder materials and the target porosity of the porous body.

In order to facilitate growth of columnar grains as well as to attain a high porosity, the compact density is preferably low. In order to ensure attainment of the strength that is required for handling the compact, and to improve the strength of the porous body after the heat treatment, however, it is necessary to prepare the compact with a compact density exceeding a certain constant level. When commercially available $\alpha$-$Si_3N_4$ powder is employed, it is preferable to set the compact density at 30 to 60% of theoretical density, more preferably at 35 to 50%. If only the compound of the rare earth element is added, the porosity after the heat treatment exceeds 30% when the compact density is less than 30% in relative density, while the pore size is also increased and a porous body having high bending strength cannot be obtained even if columnar crystals are formed. When the compact density exceeds 60% in relative density, on the other hand, it is possible to attain sufficiently high bending strength in the porous body, while porosity is less than 30% and the pore size is also reduced.

The compact as obtained is heat treated in a nitrogen atmosphere at a temperature of at least 1500° C. after a compacting assistant (resin or the like) is removed by thermal decomposition or the like. Transition to $\beta$-$Si_3N_4$ (in a case of employing $\alpha$ powder) and grain growth (columnarization) proceed by the heat treatment, so that the compact is converted to a porous body mainly consisting of $\beta$-$Si_3N_4$ columnar grains. The heat treatment temperature varies with the composition of the additive, the grain size of the raw material powder, and the mean pore size and the porosity of the target porous body.

When only a compound of a rare earth element such as $Y_2O_3$ is added, for example, it is necessary to make the heat treatment in a high temperature region of at least 1700° C. In this case, no remarkable densification proceeds even if the heat treatment is carried out at a higher temperature, and hence it is also possible to carry out the heat treatment in a temperature region extremely increasing the pore size. When the compound(s) of the element(s) of the group(s) IIa and/or IIIb of the periodic table and/or the transition metal element(s) is/are added in addition to the compound of the rare earth element, on the other hand, a liquid phase is formed in a low temperature region and $Si_3N_4$ which is dissolved in this liquid phase is precipitated as columnar $\beta$-grains as described above, whereby it is possible to prepare a porous body of high strength also by a heat treatment in a low temperature region. However, a heat treatment which is carried out at a high temperature is improper as a method of preparing a porous body due to progress of densification. The densification is readily facilitated and the porosity is readily reduced as the additional amount of the compound(s) of the element(s) of the group(s) IIa and/or IIIb and/or the transition metal element(s) is increased.

Therefore, the heat treatment temperature for the compact is preferably in the range of 600° to 1900° C. if the amount of addition of the compound(s) of the element(s) of the group(s) IIa and/or IIIb and/or the transition metal element(s) is in excess of 0 volume % and not more than 1 volume %, 1600° to 1850° C. if the amount of addition of the compound is in excess of 1 volume % and not more than 2 volume %, and 1500° to 1700° C. if the amount of addition is in excess of 2 volume and not more than 5 volume %. In general, grain growth is not sufficient if the heat treatment temperature for the compact is less than 1500° C.

Since silicon nitride is increased in decomposition pressure at a high temperature, it is necessary to increase a nitrogen partial pressure with the heat treatment temperature. The atmosphere of the heat treatment may be an inert atmosphere containing nitrogen, and a mixed atmosphere of argon (Ar) or the like may be employed. A temperature of at least 1700° C. is required when no compound(s) of the element(s) of the group(s) IIa and/or IIIb of the periodic table is added, but a heat treatment at a temperature exceeding 2100° C. is advantageous for preparation of a porous body having a large pore size due to extreme grain growth. However, the nitrogen partial pressure must be at least several 100 atm. in order to control the porosity and the bending strength to be in the inventive ranges, i.e. at least 30% and at least 80 MPa at room temperature and at least 50 MPa at a temperature of 1000° C. respectively, and the cost is disadvantageously increased in view of the apparatus required to achieve this. When the heat treatment is carried out at a temperature exceeding 2100° C., further, the use of the porous body is also disadvantageously restricted due to a tendency that the bending strength of the porous body is also reduced. Thus, the heat treatment temperature is preferably not more than 2100° C.

The porous body thus obtained has a structure in which $\beta$-$Si_3N_4$ columnar crystal grains are joined with each other by a grain boundary phase that is formed from the compound of the rare earth element, the compound(s) of the element(s) of the group(s) IIa and/or IIIb of the periodic table and/or the transition metal element(s), or an Si substance derived from the $Si_3N_4$ powder, and that exhibits high strength also when the porosity is high. It is conceivable that the reasons why such a high strength are that the inventive porous body has such a structure in which the columnar crystal grains are entangled with each other dissimilarly to a generally employed $Al_2O_3$ porous body having a polycrystalline network structure consisting of spherical crystal grains, and that the columnar grains have extremely high strength (several GPa) since they are single crystals having substantially no defects.

In this porous body, it is possible to arbitrarily control the mean pore size within the range of at least 0.05 μm and not more than 12 μm by the grain size of the raw material powder and the compact density. If the mean pore size is less than 0.05 μm, development of the columnar grains is not sufficient and the aspect ratio thereof is less than 3. As a result, the porosity is disadvantageously reduced. When the mean pore size exceeds 12 μm, on the other hand, the sizes of the crystal grains exceed 36 μm in length and 12 μm in breadth, which reduces the strength. Therefore, it is possible to employ the inventive porous body in the field of microfiltration etc. in a higher temperature environment or in an arrangement in which it receives a load, by controlling the mean pore size within the aforementioned range.

The ratio of $\beta$-$Si_3N_4$ forming the columnar grains is preferably at least 60% of the entire $Si_3N_4$, and more preferably at least 90% thereof. The ratio of $\beta$-$Si_3N_4$ is thus defined at an extremely high value, since $\alpha$-$Si_3N_4$, which is another crystal form of $Si_3N_4$, exhibits a spherical shape and causes a reduction in strength. When $\beta$-silicon nitride columnar grains are at least 60% and less than 90% of the entire silicon nitride grains, the crystal structure thereof is in such a form that $\alpha$-silicon nitride grains and $\beta$-silicon nitride columnar grains are composed with each other. In this case, the $\beta$-columnar grains couple portions where s-crystal grains exist with each other, whereby it is possible to attain higher strength than that having a p-transition ratio of less than 60%. Further, growth of such columnar grains also serves to prevent densification. Since $Si_3N_4$ exhibits high oxidation resistance, the silicon nitride ceramics porous body can be employed without breakage even when a high load is applied at a high temperature. Further, the silicon nitride ceramics porous body according to the present invention has high strength and a low coefficient of thermal expansion, whereby it also has excellent characteristics as to a thermal shock.

While specifically a silicon nitride ceramics porous body has been described above, the inventive body is not limited thereto because both high porosity and high strength essentially result from a structure in which the columnar grains are entangled with each other, regardless of the specific ceramic composition. Thus, another material having such a structure in which columnar grains are entangled with each other also provides a similar effect. For example, such behavior is recognized also in aluminum nitride containing Si and a sintering assistant such as an oxide of a rare earth element as impurities. In general, therefore, it is possible to attain the aforementioned effect in a ceramics porous body having a porosity of at least 30% when the same is mainly composed of columnar ceramics grains having an aspect ratio of at least 3. The porous body is excellent in the aforementioned effect when the aspect ratio, which indicates a ratio of the length to the breadth of the columnar grains, is high in general, while the effect of improvement in strength is small if the aspect ratio is less than 3. In many samples according to the invention, the aspect ratio is at least 10.

Further, the columnar grains of the silicon nitride ceramics porous body have a hexagonal pole or rod shape. In this case, the pores are formed by side surfaces of the hexagonal poles. It has been proved as the result of study by the inventors that, when the side surfaces, which are planes, are covered with a metal (platinum, for example) serving as a catalyst, the metal can uniformly adhere onto the surfaces and is thereby improved in performance as a catalyst.

DETAILED DESCRIPTION OF PREFERRED
EXAMPLE EMBODIMENTS AND OF THE
BEST MODE OF THE INVENTION

Example 1

An yttrium oxide powder material of 0.5 μm mean grain size (specific surface area: 7 m$^2$/g) were added to a silicon nitride powder material mainly composed of $\alpha$-silicon nitride ($\alpha$-$Si_3N_4$) of 0.3 μm mean grain size (specific surface area: 11 m$^2$/g), and mixed with ethanol as a solvent in a ball mill for 72 hours. Amounts of addition of the yttrium oxide powder material are shown in Table 1.

Mixed powder materials obtained in the aforementioned manner were dried and thereafter compacted using a metal die of 100 mm×100 mm dimensions under a pressure of 20 kg/cm$^2$ with addition of a compacting assistant. Compacts as obtained were about 15 mm in thickness and about 35% in relative density in every composition. The relative density was determined by dividing the compact density, which was calculated from measurements of the weight and dimensions, by the theoretical density, which was a weighted mean of silicon nitride and the additive.

The compacts as obtained were heat treated under conditions shown in Table 1, thereby obtaining porous bodies. Test pieces of 3 mm×4 mm×40 mm in size for a three-point bending test in accordance with JIS 1601 were cut out from the porous bodies. The test pieces were employed for measuring bending strength values at an ordinary room temperature and at 1000° C. Further, porosity values were calculated from the relative density values (porosity (%)= 100−relative density (%)). In addition, β-transition ratios were obtained from X-ray diffraction peak intensity ratios, by carrying out X-ray diffraction through the porous bodies as obtained. The calculation expression is shown below.

$$(\beta\text{-transition ratio}) (\%) = \{A/(A+B)\} \times 100$$

where A represents X-ray diffraction peak intensity of β-silicon nitride, and B represents an X-ray diffraction peak intensity ratio of α-silicon nitride.

A scanning electron microscope (SEM) was employed to observe broken-out sections, thereby obtaining mean crystal grain sizes. Mean pore sizes were measured with a mercury porosimeter. These measurement results are shown in Table 1.

compounds of rare earth elements in place of yttrium oxide powder materials, and evaluated. The results are shown in Table 2. It is understood from the results that similar silicon nitride porous bodies are obtained also when rare earth oxides other than yttrium oxide are employed.

TABLE 1

| | Additive | Heat Treatment Condition | | | Porous Body Characteristics | | | | Bending Strength | | β-Transition |
|---|---|---|---|---|---|---|---|---|---|---|---|
| | | | | | | | Crystal Grain Size | | Room | | |
| No. | $Y_2O_3$ (Vol %) | Temperature (°C.) | Retention Time (H) | Pressure of Atmosphere (atm) | Porosity (%) | Mean Pore Size (μm) | Length (μm) | Breadth (μm) | Temperature (MPa) | 1000° C. (MPa) | Ratio (%) |
| 1 | 0 | 1800 | 2 | 4 | 60 | 0.5 | — | 0.5 | 7 | 1 | 30 |
| 2 | 0.5 | 1800 | 2 | 4 | 45 | 0.8 | 1 | 0.5 | 80 | 80 | 100 |
| 3 | 1 | 1800 | 2 | 4 | 39 | 1.5 | 3 | 0.8 | 150 | 150 | 100 |
| 4 | 2 | 1800 | 2 | 4 | 48 | 1.8 | 12 | 0.8 | 130 | 100 | 100 |
| 5 | 4 | 1800 | 2 | 4 | 48 | 0.8 | 15 | 1.0 | 120 | 100 | 100 |
| 6 | 8 | 1800 | 2 | 4 | 58 | 3.5 | 20 | 1.5 | 100 | 85 | 100 |
| 7 | 12 | 1800 | 2 | 4 | 57 | 3.0 | 20 | 1.6 | 110 | 70 | 100 |
| 8 | 20 | 1800 | 2 | 4 | 55 | 4.0 | 18 | 1.8 | 100 | 60 | 100 |
| 9 | 30 | 1800 | 2 | 4 | 50 | 3.0 | 25 | 2.0 | 90 | 40 | 100 |
| 10 | 4 | 1500 | 2 | 4 | 61 | 0.3 | — | 0.4 | 5 | 0.7 | 15 |
| 11 | 4 | 1600 | 2 | 4 | 60 | 0.4 | 1.5 | 0.4 | 6 | 0.8 | 20 |
| 12 | 4 | 1700 | 2 | 4 | 58 | 1.0 | 3 | 0.5 | 85 | 55 | 70 |
| 13 | 4 | 1700 | 2 | 4 | 56 | 2.0 | 10 | 0.8 | 100 | 80 | 90 |
| 14 | 4 | 1800 | 2 | 4 | 55 | 2.5 | 15 | 1.2 | 120 | 100 | 100 |
| 15 | 4 | 1900 | 2 | 10 | 55 | 3.5 | 20 | 1.5 | 110 | 100 | 100 |
| 16 | 4 | 2000 | 2 | 40 | 54 | 8.0 | 35 | 2.0 | 90 | 80 | 100 |
| 17 | 4 | 2100 | 2 | 100 | 54 | 12.0 | 50 | 3.0 | 80 | 60 | 100 |
| 18 | 4 | 1800 | 1 | 4 | 54 | 2.5 | 12 | 1.2 | 120 | 90 | 100 |
| 19 | 4 | 1800 | 5 | 4 | 55 | 3.5 | 20 | 1.5 | 110 | 90 | 100 |
| 20 | 4 | 1800 | 2 | 10 | 57 | 3.0 | 20 | 1.5 | 110 | 100 | 100 |
| 21 | 4 | 1650 | 2 | 4 | 53 | 0.8 | 2.0 | 0.6 | 61 | 38 | 50 |
| 22 | 4 | 1700 | 2 | 4 | 52 | 1.0 | 2.3 | 0.7 | 80 | 50 | 60 |
| 23 | 4 | 2100 | 10 | 100 | 15 | 13.0 | 42 | 3.8 | 40 | 32 | 100 |
| 24 | 2 | 1700 | 20 | 10 | 28 | 0.04 | 0.11 | 0.04 | 65 | 28 | 75 |

Example 2

Porous bodies were prepared by a method similar to that in Example 1 except that oxide powder materials of respective rare earth elements shown in Table 2 were employed as

TABLE 2

| Additive | | Heat Treatment Condition | | | Porous Body Characteristics | | | | | | |
|---|---|---|---|---|---|---|---|---|---|---|---|
| | | | | | | | Crystal Grain Size | | Bending Strength | | β-Transition |
| A Group Additive | Additional Ratio (Vol %) | Temperature (°C.) | Retention Time (H) | Pressure of Atmosphere (atm) | Porosity (%) | Pore Size (μm) | Length (μm) | Breadth (μm) | Room Temperature (MPa) | 1000° C. (MPa) | Ratio (%) |
| $La_2O_3$ | 4 | 1800 | 2 | 4 | 50 | 2.0 | 18 | 1.4 | 130 | 100 | 100 |
| $CeO_2$ | 4 | 1800 | 2 | 4 | 52 | 2.2 | 20 | 1.4 | 100 | 80 | 100 |
| $Nd_2O_3$ | 4 | 1800 | 2 | 4 | 48 | 2.2 | 15 | 1.4 | 130 | 90 | 100 |
| $Gd_2O_3$ | 4 | 1800 | 2 | 4 | 52 | 2.4 | 15 | 1.1 | 120 | 80 | 100 |
| $Dy_2O_3$ | 4 | 1800 | 2 | 4 | 53 | 2.5 | 16 | 1.3 | 110 | 90 | 100 |
| $Yb_2O_3$ | 4 | 1800 | 2 | 4 | 55 | 2.8 | 20 | 1.5 | 100 | 80 | 100 |
| $Y_2O_3$ | 4 | 1800 | 2 | 4 | 55 | 2.5 | 15 | 1.2 | 120 | 100 | 100 |

Example 3

Porous bodies were prepared by a method similar to that in Example 1 except that yttrium oxide, being an oxide of a rare earth element, was added as an A group additive, and aluminum oxide, magnesium oxide and titanium oxide, being compounds of elements of the groups IIa and IIIb of the periodic table and a transition metal element, were added as B group additional compounds, and evaluated. The results are shown in Table 3.

As can be seen from Table 3, it is understood that it is possible to prepare silicon nitride porous bodies at lower temperatures in the present Example than in Examples in which only rare earth oxides were added.

TABLE 3.1

| | Additive | | | | Heat Treatment Condition | | |
|---|---|---|---|---|---|---|---|
| No. | A Group Additive | Additional Ratio (Vol %) | B Group Additive | Additional Ratio (Vol %) | Temperature (°C.) | Retention Time (H) | Pressure of Atmosphere (atm) |
| 1 | $Y_2O_3$ | 4 | $Al_2O_3$ | 0 | 1800 | 2 | 4 |
| 2 | $Y_2O_3$ | 4 | $Al_2O_3$ | 0.5 | 1800 | 2 | 4 |
| 3 | $Y_2O_3$ | 4 | $Al_2O_3$ | 1.2 | 1800 | 2 | 4 |
| 4 | $Y_2O_3$ | 4 | $Al_2O_3$ | 2 | 1800 | 2 | 4 |
| 5 | $Y_2O_3$ | 4 | $Al_2O_3$ | 5 | 1800 | 2 | 4 |
| 6 | $Y_2O_3$ | 4 | $Al_2O_3$ | 10 | 1800 | 2 | 4 |
| 7 | $Y_2O_3$ | 4 | $Al_2O_3$ | 0.5 | 1500 | 2 | 1 |
| 8 | $Y_2O_3$ | 4 | $Al_2O_3$ | 0.5 | 1600 | 2 | 1 |
| 9 | $Y_2O_3$ | 4 | $Al_2O_3$ | 0.5 | 1700 | 2 | 4 |
| 10 | $Y_2O_3$ | 4 | $Al_2O_3$ | 0.5 | 1750 | 2 | 4 |
| 11 | $Y_2O_3$ | 4 | $Al_2O_3$ | 0.5 | 1900 | 2 | 10 |
| 12 | $Y_2O_3$ | 4 | $Al_2O_3$ | 2 | 1700 | 2 | 4 |

| | Porous Body Characteristics | | | | | | |
|---|---|---|---|---|---|---|---|
| | | | Crystal Grain Size | | Bending Strength | | β-Transition |
| No. | Porosity (%) | Pore Size (μm) | Length (μm) | Breadth (μm) | Room Temperature (MPa) | 1000° C. (MPa) | Ratio (%) |
| 1 | 55 | 2.5 | 15 | 1.2 | 120 | 100 | 100 |
| 2 | 45 | 2 | 15 | 1.5 | 150 | 100 | 100 |
| 3 | 28 | 1.9 | 15 | 1.5 | 170 | 120 | 100 |
| 4 | 12 | 1.5 | 15 | 1.5 | 220 | 150 | 100 |
| 5 | 2 | 1 | 12 | 1.5 | 540 | 350 | 100 |
| 6 | 4 | 1 | 10 | 2 | 350 | 210 | 100 |
| 7 | 58 | 0.5 | 1.5 | 0.5 | 50 | 40 | 40 |
| 8 | 54 | 1.5 | 7 | 0.7 | 80 | 40 | 90 |
| 9 | 48 | 1.8 | 12 | 1 | 120 | 100 | 100 |
| 10 | 44 | 2.2 | 15 | 1.2 | 130 | 100 | 100 |
| 11 | 40 | 2.5 | 20 | 2.2 | 130 | 110 | 100 |
| 12 | 35 | 1 | 10 | 1.2 | 110 | 80 | 100 |

TABLE 3.2

| | Additive | | | | Heat Treatment Condition | | |
|---|---|---|---|---|---|---|---|
| No. | A Group Additive | Additional Ratio (Vol %) | B Group Additive | Additional Ratio (Vol %) | Temperature (°C.) | Retention Time (H) | Pressure of Atmosphere (atm) |
| 13 | Y₂O₃ | 4 | Al₂O₃ | 2 | 1750 | 2 | 4 |
| 14 | Y₂O₃ | 4 | Al₂O₃ | 5 | 1700 | 2 | 4 |
| 15 | Y₂O₃ | 4 | MgO | 0.5 | 1500 | 2 | 4 |
| 16 | Y₂O₃ | 4 | MgO | 1.2 | 1500 | 2 | 4 |
| 17 | Y₂O₃ | 4 | MgO | 2 | 1500 | 2 | 4 |
| 18 | Y₂O₃ | 4 | MgO | 5 | 1500 | 2 | 4 |
| 19 | Y₂O₃ | 4 | MgO | 10 | 1500 | 2 | 4 |
| 20 | Y₂O₃ | 4 | MgO | 0.5 | 1600 | 2 | 4 |
| 21 | Y₂O₃ | 4 | MgO | 1.2 | 1600 | 2 | 4 |
| 22 | Y₂O₃ | 4 | MgO | 2 | 1600 | 2 | 4 |
| 23 | Y₂O₃ | 4 | MgO | 5 | 1600 | 2 | 4 |
| 24 | Y₂O₃ | 4 | MgO | 10 | 1600 | 2 | 4 |

| | Porous Body Characteristics | | | | | |
|---|---|---|---|---|---|---|
| | | Pore | Crystal Grain Size | | Bending Strength | | β-Transition |
| No. | Porosity (%) | Size (μm) | Length (μm) | Breadth (μm) | Room Temperature (MPa) | 1000° C. (MPa) | Ratio (%) |
| 13 | 31 | 1.3 | 15 | 1.3 | 140 | 80 | 100 |
| 14 | 20 | 0.8 | 10 | 1.2 | 160 | 120 | 100 |
| 15 | 53 | 0.9 | 2 | 0.5 | 70 | 50 | 70 |
| 16 | 50 | 1 | 2.5 | 0.6 | 90 | 60 | 80 |
| 17 | 42 | 1 | 3 | 0.7 | 100 | 60 | 90 |
| 18 | 32 | 0.9 | 3 | 0.6 | 100 | 50 | 95 |
| 19 | 26 | 0.8 | 4 | 0.8 | 130 | 40 | 100 |
| 20 | 50 | 1.2 | 10 | 1.2 | 100 | 60 | 90 |
| 21 | 42 | 1.2 | 10 | 1 | 110 | 70 | 95 |
| 22 | 38 | 1.2 | 12 | 1 | 120 | 70 | 100 |
| 23 | 30 | 1 | 12 | 1.3 | 150 | 70 | 100 |
| 24 | 15 | 0.9 | 15 | 1.5 | 200 | 50 | 100 |

TABLE 3.3

| | Additive | | | | Heat Treatment Condition | | |
|---|---|---|---|---|---|---|---|
| No. | A Group Additive | Additional Ratio (Vol %) | B Group Additive | Additional Ratio (Vol %) | Temperature (°C.) | Retention Time (H) | Pressure of Atmosphere (atm) |
| 25 | Y₂O₃ | 4 | MgO | 0.5 | 1800 | 2 | 4 |
| 26 | Y₂O₃ | 4 | MgO | 1.2 | 1800 | 2 | 4 |
| 27 | Y₂O₃ | 4 | MgO | 2 | 1800 | 2 | 4 |
| 28 | Y₂O₃ | 4 | MgO | 5 | 1800 | 2 | 4 |
| 29 | Y₂O₃ | 4 | MgO | 10 | 1800 | 2 | 4 |
| 30 | Y₂O₃ | 4 | MgO | 0.5 | 1400 | 2 | 4 |
| 31 | Y₂O₃ | 4 | MgO | 0.5 | 1700 | 2 | 4 |
| 32 | Y₂O₃ | 4 | MgO | 0.5 | 1800 | 2 | 4 |
| 33 | Y₂O₃ | 4 | MgO | 0.5 | 1900 | 2 | 10 |
| 34 | Y₂O₃ | 4 | MgO | 0.5 | 2000 | 2 | 100 |
| 35 | Y₂O₃ | 4 | TiO₂ | 0.5 | 1800 | 2 | 4 |
| 36 | Y₂O₃ | 4 | TiO₂ | 1.2 | 1800 | 2 | 4 |

| | Porous Body Characteristics | | | | | |
|---|---|---|---|---|---|---|
| | | Pore | Crystal Grain Size | | Bending Strength | | β-Transition |
| No. | Porosity (%) | Size (μm) | Length (μm) | Breadth (μm) | Room Temperature (MPa) | 1000° C. (MPa) | Ratio (%) |
| 25 | 42 | 1.8 | 20 | 1.8 | 140 | 100 | 100 |

TABLE 3.3-continued

| 26 | 20 | 1.2 | 22 | 2 | 210 | 150 | 100 |
|---|---|---|---|---|---|---|---|
| 27 | 2 | — | 25 | 2 | 500 | 300 | 100 |
| 28 | 1 | — | 25 | 2.5 | 550 | 300 | 100 |
| 29 | 1 | — | 20 | 2.5 | 450 | 270 | 100 |
| 30 | 55 | 0.8 | 1 | 0.5 | 40 | 20 | 30 |
| 31 | 45 | 1.5 | 15 | 1.6 | 130 | 80 | 100 |
| 32 | 42 | 1.8 | 20 | 1.8 | 140 | 100 | 100 |
| 33 | 35 | 2.3 | 25 | 2 | 120 | 80 | 100 |
| 34 | 35 | 3 | 30 | 2.5 | 70 | 40 | 100 |
| 35 | 45 | 0.6 | 12 | 1.0 | 150 | 120 | 100 |
| 36 | 42 | 0.6 | 10 | 0.7 | 200 | 150 | 100 |

TABLE 3.4

| | Additive | | | | Heat Treatment Condition | | |
|---|---|---|---|---|---|---|---|
| No. | A Group Additive | Additional Ratio (Vol %) | B Group Additive | Additional Ratio (Vol %) | Temperature (°C.) | Retention Time (H) | Pressure of Atmosphere (atm) |
| 37 | $Y_2O_3$ | 4 | $TiO_2$ | 2 | 1800 | 2 | 4 |
| 38 | $Y_2O_3$ | 4 | $TiO_2$ | 5 | 1800 | 2 | 4 |
| 39 | $Y_2O_3$ | 4 | $TiO_2$ | 10 | 1800 | 2 | 4 |
| 40 | $Y_2O_3$ | 4 | $TiO_2$ | 0.5 | 1600 | 2 | 4 |
| 41 | $Y_2O_3$ | 4 | $TiO_2$ | 0.5 | 1700 | 2 | 4 |
| 42 | $Y_2O_3$ | 8 | $Al_2O_3$ | 3.5 | 1650 | 10 | 10 |
| 43 | $Y_2O_3$ | 8 | $Al_2O_3$ | 0.5 | 2100 | 20 | 100 |
| 44 | $Y_2O_3$ | 8 | MgO | 4.5 | 1600 | 10 | 10 |
| 45 | $Y_2O_3$ | 8 | MgO | 0.2 | 2100 | 15 | 100 |
| 46 | $Y_2O_3$ | 8 | $TiO_2$ | 4.5 | 1700 | 10 | 10 |
| 47 | $Y_2O_3$ | 8 | $TiO_2$ | 0.8 | 2100 | 20 | 100 |

| | Porous Body Characteristics | | | | | |
|---|---|---|---|---|---|---|
| | | Pore | Crystal Grain Size | | Bending Strength | | β-Transition |
| No. | Porosity (%) | Size (μm) | Length (μm) | Breadth (μm) | Room Temperature (MPa) | 1000° C. (MPa) | Ratio (%) |
| 37 | 40 | 0.5 | 8 | 0.5 | 225 | 170 | 100 |
| 38 | 35 | 0.5 | 8 | 0.5 | 315 | 180 | 100 |
| 39 | 28 | 0.2 | 4 | 0.3 | 421 | 350 | 100 |
| 40 | 52 | 0.3 | 7 | 0.5 | 72 | 38 | 90 |
| 41 | 50 | 0.7 | 8 | 0.8 | 180 | 110 | 100 |
| 42 | 18 | 0.03 | 0.09 | 0.04 | 79 | 42 | 72 |
| 43 | 25 | 12.5 | 45 | 13 | 62 | 48 | 100 |
| 44 | 10 | 0.01 | 0.02 | 0.01 | 66 | 18 | 68 |
| 45 | 27 | 15.0 | 38 | 5 | 55 | 35 | 100 |
| 46 | 5 | 0.04 | 0.08 | 0.03 | 85 | 41 | 75 |
| 47 | 28 | 12.8 | 29 | 8 | 72 | 40 | 100 |

Example 4

Silicon oxide powder (20.6 volume %) and yttrium oxide powder (1.2 volume %) of 0.5 μm mean grain size were added to aluminum nitride powder of 0.5 μm mean grain size, and mixed with an ethanol solvent in a ball mill for 72 hours.

Mixed powder thus obtained was dried and thereafter compacted using a metal die of 10 mm×10 mm dimensions under a pressure of 20 kg/cm² with addition of a compacting assistant. Density of the compact as obtained was 37% in relative density.

This compact was heat treated in the atmosphere at a temperature of 600° C. for 1 hour for removing the compacting assistant, and thereafter heat treated in nitrogen at atmospheric pressure at a temperature of 1700° C. for 1 hour, to obtain a porous body. Porosity, a mean pore size and a mean aspect ratio of crystal grains of this porous body were 35%, 1.6 μm and 4 respectively. Three-point bending strength values at an ordinary room temperature and at 1000° C. were 90 MPa and 60 MPa respectively.

Example 5

α-silicon nitride raw powder materials of 0.3 μm, 7.0 μm and 12.0 μm mean grain size were employed to prepare mixed powder materials so that yttrium oxide powder contents were 4 volume % in the case of the powder of 0.3 μm and 5 volume % in the cases of 7.0 μm and 12.0 μm by a method similar to that in Example 1, thereby preparing compacts having relative density values shown in Table 4. Compact density values were adjusted by changing uniaxial compacting pressures in the range of at least 1 kg/cm² and not more than 2000 kg/cm². The compacts as obtained were treated and evaluated under the same conditions as those in Example 1 except that heat treatments after decomposition of a compacting assistant were carried out under the same conditions in nitrogen of 4 atm. at a temperature of 1800° C. for 2 hours. The evaluation results are shown in Table 4.

From these results, it is understood that it is possible to control the mean pore sizes of the porous bodies obtained after the heat treatments by controlling the mean grain sizes of the raw powder materials and the density values of the compacts.

are shown in Table 5. Table 5 shows flow rate results in a case of employing α-alumina ceramics porous bodies having the same pore sizes as comparative examples.

It is understood from the results that the silicon nitride porous bodies have higher performance with regard to liquid permeation flow rates than do the alumina porous bodies.

TABLE 4.1

| Raw Material | | Heat Treatment Condition | | | | Characteristics | | | | | | |
|---|---|---|---|---|---|---|---|---|---|---|---|---|
| | Compact | | | | Pressure of | | Mean | Crystal Grain Size | | Bending Strength | | β-Tran- |
| Grain Size (μm) | Additive Y₂O₃ (Vol. %) | Relative Density (%) | Temperature (°C.) | Retention Time (H) | Atmosphere (atm) | Porosity (%) | Pore Size (μm) | Major Axis (μm) | Minor Axis (μm) | Room Temperature (MPa) | 1000° C. (MPa) | sition Ratio (%) |
| 0.3 | 4 | 20 | 1800 | 2 | 4 | 72 | 1.6 | 22 | 1.7 | 40 | 35 | 100 |
| 0.3 | 4 | 25 | 1800 | 2 | 4 | 70 | 1.6 | 20 | 1.7 | 60 | 50 | 100 |
| 0.3 | 4 | 27 | 1800 | 2 | 4 | 67 | 1.5 | 20 | 1.5 | 70 | 50 | 100 |
| 0.3 | 4 | 30 | 1800 | 2 | 4 | 60 | 1.2 | 18 | 1.2 | 100 | 80 | 100 |
| 0.3 | 4 | 35 | 1800 | 2 | 4 | 48 | 0.8 | 15 | 1.0 | 120 | 100 | 100 |
| 0.3 | 4 | 40 | 1800 | 2 | 4 | 42 | 0.6 | 10 | 0.8 | 150 | 130 | 100 |
| 0.3 | 4 | 45 | 1800 | 2 | 4 | 40 | 0.5 | 6 | 0.5 | 180 | 150 | 100 |
| 0.3 | 4 | 50 | 1800 | 2 | 4 | 38 | 0.2 | 4 | 0.2 | 210 | 180 | 100 |
| 0.3 | 4 | 55 | 1800 | 2 | 4 | 35 | 0.1 | 2 | 0.1 | 280 | 230 | 100 |
| 0.3 | 4 | 60 | 1800 | 2 | 4 | 31 | 0.05 | 1 | 0.07 | 350 | 280 | 100 |
| 0.3 | 4 | 65 | 1800 | 2 | 4 | 27 | 0.03 | 1 | 0.06 | 400 | 350 | 100 |
| 0.3 | 4 | 70 | 1800 | 2 | 4 | 20 | 0.02 | 1 | 0.05 | 450 | 400 | 100 |
| 7.0 | 5 | 20 | 1800 | 2 | 4 | 50 | 5.1 | 22 | 2.5 | 50 | 40 | 100 |
| 7.0 | 5 | 28 | 1800 | 2 | 4 | 47 | 3.8 | 20 | 2.1 | 60 | 50 | 100 |

TABLE 4.2

| Raw Material | | Heat Treatment Condition | | | | Characteristics | | | | | | |
|---|---|---|---|---|---|---|---|---|---|---|---|---|
| | Compact | | | | Pressure of | | Mean | Crystal Grain Size | | Bending Strength | | β-Tran- |
| Grain Size (μm) | Additive Y₂O₃ (Vol. %) | Relative Density (%) | Temperature (°C.) | Retention Time (H) | Atmosphere (atm) | Porosity (%) | Pore Size (μm) | Major Axis (μm) | Minor Axis (μm) | Room Temperature (MPa) | 1000° C. (MPa) | sition Ratio (%) |
| 7.0 | 5 | 30 | 1800 | 2 | 4 | 43 | 2.4 | 18 | 1.7 | 88 | 70 | 100 |
| 7.0 | 5 | 40 | 1800 | 2 | 4 | 40 | 1.8 | 15 | 1.2 | 130 | 100 | 100 |
| 7.0 | 5 | 50 | 1800 | 2 | 4 | 38 | 1.2 | 14 | 1.1 | 210 | 150 | 100 |
| 7.0 | 5 | 60 | 1800 | 2 | 4 | 32 | 0.7 | 12 | 0.8 | 220 | 180 | 100 |
| 7.0 | 5 | 65 | 1800 | 2 | 4 | 19 | 0.3 | 10 | 0.5 | 250 | 200 | 100 |
| 12.0 | 5 | 20 | 1800 | 2 | 4 | 60 | 6 | 28 | 3.0 | 50 | 30 | 100 |
| 12.0 | 5 | 28 | 1800 | 2 | 4 | 60 | 4 | 25 | 2.5 | 82 | 65 | 100 |
| 12.0 | 5 | 30 | 1800 | 2 | 4 | 58 | 3.5 | 16 | 1.8 | 105 | 88 | 100 |
| 12.0 | 5 | 40 | 1800 | 2 | 4 | 53 | 3.1 | 12 | 1.7 | 170 | 103 | 100 |
| 12.0 | 5 | 50 | 1800 | 2 | 4 | 50 | 2.0 | 8 | 1.4 | 190 | 120 | 100 |
| 12.0 | 5 | 60 | 1800 | 2 | 4 | 37 | 1.5 | 7 | 1.3 | 210 | 180 | 100 |
| 12.0 | 5 | 65 | 1800 | 2 | 4 | 28 | 1.2 | 5 | 1.1 | 240 | 200 | 100 |
| 12.0 | 5 | 20 | 2100 | 2 | 100 | 25 | 13.2 | 45 | 11 | 43 | 18 | 100 |

Example 6

Silicon nitride ceramics porous bodies of 0.1 to 5.0 μm in mean pore size which were prepared by the inventive preparation method were worked into the form of discs of φ25 mm×0.5 mm thickness. These porous bodies were employed to carry out permeation experiments using isopropyl alcohol (20° C.) and pure water (20° C.). The results

TABLE 5

| Material | Grain Size (μm) | Porosity (%) | IPA Flow Rate (ml/min/cm$^2$) | Pure Water Flow Rate (ml/min/cm$^2$) |
| --- | --- | --- | --- | --- |
| Silicon Nitride | 0.1 | 45 | 0.82 | 1.97 |
| Silicon Nitride | 0.2 | 48 | 2.01 | 4.82 |
| Silicon Nitride | 0.5 | 60 | 4.11 | 9.86 |
| Silicon Nitride | 1.0 | 60 | 14.1 | 33.8 |
| Silicon Nitride | 2.0 | 55 | 22.5 | 54.0 |
| Silicon Nitride | 5.0 | 50 | 40.3 | 96.7 |
| α-Alumina | 0.1 | 40 | 0.43 | 1.02 |
| α-Alumina | 0.2 | 40 | 1.06 | 2.55 |
| α-Alumina | 0.5 | 40 | 1.78 | 4.25 |
| α-Alumina | 1.0 | 40 | 4.96 | 11.9 |
| α-Alumina | 2.0 | 40 | 8.85 | 21.25 |
| α-Alumina | 5.0 | 40 | 17.7 | 42.5 |

According to the present invention, as hereinabove described, it is possible to obtain a ceramics porous body having high porosity and high strength. This porous body, which is excellent in high temperature characteristics and chemical resistance, is useful as a filter which is employed at a high temperature or a catalytic carrier which is employed in an atmosphere having high corrosiveness.

Although the invention has been described with reference to specific example embodiments, it will be appreciated that it is intended to cover all modifications and equivalents within the scope of the appended claims.

We claim:

1. A ceramic porous body comprising silicon nitride ceramic crystal grains including columnar β silicon nitride ceramic crystal grains with a hexagonal cross-section, and a compound of a rare earth element with at least 1 vol. % and not more than 20 vol. % of an oxide of said rare earth element relative to the total composition of said porous body, wherein said porous body has pores with a mean pore size of at least 0.05 μm and not more than 12 μm and has a porosity of at least 30%, said columnar ceramic crystal grains have an aspect ratio of at least 3, and at least 60% of all of said silicon nitride ceramic crystal grains are said β silicon nitride grains.

2. The ceramic porous body of claim 1, wherein the content of said rare earth element is further limited to at least 2 vol. % and not more than 10 vol. % of an oxide of said rare earth element relative to the total composition of said porous body.

3. The ceramic porous body of claim 1, further comprising at least one additional compound of at least one element selected from the group consisting of the elements of groups IIa and IIIb of the periodic table and transition metal elements, with not more than 5 vol. % of an oxide of said at least one element relative to the total composition of said porous body.

4. The ceramic porous body of claim 3, wherein the content of said at least one additional compound is further limited to not more than 2 vol. % of an oxide of said at least one element relative to the total composition of said porous body.

5. The ceramic porous body of claim 1, having a bending strength of at least 80 MPa at room temperature.

6. The ceramic porous body of claim 1, having a bending strength of at least 50 MPa at a temperature of 1000° C.

7. The ceramic porous body of claim 1, having a bending strength of at least 100 MPa at a temperature of 1000° C.

8. The ceramic porous body of claim 1, wherein said porosity is at least 40%, and having a bending strength of at least 100 MPa at room temperature and a bending strength of at least 80 MPa at 1000° C.

9. The ceramic porous body of claim 1, wherein at least 90% of all of said ceramic crystal grains are said β silicon nitride grains.

10. The ceramic porous body of claim 6, wherein said columnar ceramic crystal grains are entangled with one another.

11. The ceramic porous body of claim 11, wherein said aspect ratio of said columnar grains is at least 10.

12. The ceramic porous body of claim 1, wherein said mean pore size is not more than 4 μm.

13. The ceramic porous body of claim 12, wherein said porosity is at least 50%.

14. The ceramic porous body of claim 1, wherein said porosity is greater than 70%.

15. The ceramic porous body of claim 1, wherein said mean pore size is less than 0.1μm.

16. The ceramic porous body of claim 1, produced by a process that includes a heat treatment step at a temperature of at least 1500° C.

17. The ceramic porous body of claim 16, wherein said process further includes mixing a starting material powder that has a mean grain size of at least 0.1 μm and less than 20 μm.

18. The ceramic porous body of claim 17, wherein said process further includes forming a compact of said mixed starting material powder with a compact density of at least 30% and not more than 60%.

* * * * *

UNITED STATES PATENT AND TRADEMARK OFFICE
CERTIFICATE OF CORRECTION

PATENT NO. : 5,618,765
DATED : Apr. 8, 1997
INVENTOR(S) : Takeuchi et al.

It is certified that error appears in the above-indentified patent and that said Letters Patent is hereby corrected as shown below:

On the Title Page:
In [75] all four inventors' cities should be --Itami--
In [56] the third U. S. Document's name should be --Pryzik--.
In Col. 1, line 62, "delete "on".
In Col. 2, line 21, delete "of" (first occurrence):
line 53, replace "D-$Si_3N_4$" by --$\beta$-$Si_3N_4$--
In Col. 4, line 44, replace "make" by --carry out--.
In Col. 6, line 6, replace "s-crystal" by --$\alpha$-crystal--;
line 8, replace "p-transition" by --$\beta$-transition--;
line 55, replace "were" by --was--.
In Col. 7, line 20, replace "A" by --$\underline{A}$--;
line 21, replace "B" by --$\underline{B}$--;
In Table 1, column 6, second line from the bottom, replace "15" by --25--.

UNITED STATES PATENT AND TRADEMARK OFFICE
CERTIFICATE OF CORRECTION

PATENT NO. : 5,618,765
DATED : Apr. 8, 1997
INVENTOR(S) : Takeuchi et al.

It is certified that error appears in the above-indentified patent and that said Letters Patent is hereby corrected as shown below:

Following Table 5, insert the following footnote:
 --IPA (isopropyl alcohol) flow rates and pure water flow rates are permeation flow rates in pressurization at 20°C and 1.0 kg/cm$^2$.--.

In the Claims:
Col. 18, line 24, replace "claim 6" by --claim 1--.
Col. 18, line 27, replace "claim 11" by --claim 1--.

Signed and Sealed this

Nineteenth Day of August, 1997

*Attest:*

BRUCE LEHMAN

*Attesting Officer*   *Commissioner of Patents and Trademarks*